US012791393B2

(12) United States Patent
Guo et al.

(10) Patent No.: US 12,791,393 B2
(45) Date of Patent: Nov. 10, 2026

(54) METHOD AND SYSTEM FOR MEASURING THE CARRIER- ENVELOPE PHASE OFFSET OF ULTRASHORT LASER PULSES

(71) Applicant: SPHERE ULTRAFAST PHOTONICS, S.A, Oporto (PT)

(72) Inventors: Chen Guo, Lund (SE); Cord Louis Arnold, Rydebäck (SE); Anne L'Huillier Wahlström, Lund (SE); Miguel Nicolau da Costa Ribeiro de Miranda, Oporto (PT); Helder Manuel Paiva Rebelo Cerejo Crespo, Oporto (PT); Rosa Maria Romero Muñiz, Oporto (PT)

(73) Assignee: SPHERE ULTRAFAST PHOTONICS, S.A., Oporto (PT)

( * ) Notice: Subject to any disclaimer, the term of this patent is extended or adjusted under 35 U.S.C. 154(b) by 157 days.

(21) Appl. No.: 18/635,159

(22) Filed: Apr. 15, 2024

(65) Prior Publication Data

US 2024/0344892 A1 Oct. 17, 2024

(30) Foreign Application Priority Data

Apr. 13, 2023 (PT) ........................................ 118603

(51) Int. Cl.
*G01J 11/00* (2006.01)
*G01J 9/02* (2006.01)

(52) U.S. Cl.
CPC ................ *G01J 9/02* (2013.01); *G01J 11/00* (2013.01); *G01J 2009/0261* (2013.01); *G01J 2009/0284* (2013.01)

(58) Field of Classification Search
CPC ...... G01J 9/02; G01J 11/00; G01J 2009/0261; G01J 2009/0284
See application file for complete search history.

(56) References Cited

U.S. PATENT DOCUMENTS 6,252,668 B1 * 6/2001 Hill .................... G03F 7/70775 356/485
7,701,982 B2 * 4/2010 Yu ........................ H01S 3/1109 372/18

(Continued)

OTHER PUBLICATIONS

C. Ott et al., "Strong-field spectral interferometry using the carrier-envelope phase", New J. Phys. 15, Jul. 2013, pp. 1-15.

(Continued)

*Primary Examiner* — Jonathan M Hansen
(74) *Attorney, Agent, or Firm* — Leason Ellis LLP

(57) ABSTRACT

The present document discloses a method for measuring the carrier-envelope phase, CEP, offset of ultrashort light pulses, the method comprising: generating an optical interference signal encoding the CEP offset of a light pulse to be measured; applying at least two spectral filters in parallel to the generated interference signal, wherein the transmission functions of the spectral filters are periodic and the at least two spectral filters have partial or fully orthogonal components among themselves; detecting each signal filtered by each of the at least two spectral filters to obtain a magnitude for each of the filtered signals; converting the two obtained magnitudes to a polar representation having a radius and an angle; outputting the CEP offset from the angle of the converted polar representation. It is also disclosed a corresponding system, a field-resolved spectrometer including the system and the use of the system in spectroscopy or in field-resolved spectroscopy.

20 Claims, 4 Drawing Sheets

(56) References Cited

U.S. PATENT DOCUMENTS

| | | | | |
|---|---|---|---|---|
| 2009/0135859 A1* | 5/2009 | Yu | H01S 3/1109 372/18 |
| 2012/0134676 A1* | 5/2012 | Kikuchi | H04J 14/06 398/65 |
| 2019/0368860 A1* | 12/2019 | Yan | H04L 27/2338 |
| 2020/0259305 A1* | 8/2020 | Piccoli | H01S 3/0057 |

OTHER PUBLICATIONS

T. Wittmann et al., " Single-shot carrier-envelope phase measurement of few-cycle laser pulses", Nature Physics, Apr. 2009, pp. 357-362.

Agustin Schiffrin et al., "Optical-field-induced current in dielectrics", Nature 493, Jan. 2013, 7 pages.

Ioachim Pupeza et al., "Field-resolved infrared spectroscopy of biological systems", Nature 577, Jan. 2020, 20 pages.

Anne Harth et al., "Compact 200KHz HHG source driven by a few-cycle OPCPA", J. Opt. 20, Dec. 2017, pp. 1-14.

Frederico J. Furch et al., CEP-stable few-cycle pulses with more than 190 μJ of energy at 100 kHz from a noncollinear optical parametric amplifier, Opt. Lett. 42, Jun. 2017, pp. 2495-2498.

Masayuki Kakehata et al., "Single-shot measurement of carrier-envelope phase changes by spectral interferometry", Opt. Lett. 26, Sep. 2001, pp. 1436-1438.

Dominik Hoff et al., ",Continuous every-single-shot carrier-envelope phase measurement and control at 100 kHz", Opt. Lett. 43, Aug. 2018, pp. 3850-3853.

M. Kubullek et al., "Single-shot carrier-envelope-phase measurement in ambient air", Optica 7, Jan. 2020, pp. 35-39.

T. Fordell et al., "High-speed carrier-envelope phase drift detection of amplified laser pulses", Opt. Express 19, Nov. 2011, pp. 23652-23657.

Fabian Lücking et al., "Approaching the limits of carrier-envelope phase stability in a millijoule-class amplifier", Opt. Lett. 39, Jul. 2014, pp. 3884-3888.

Sara Mikaelsson et al., "A high-repetition rate attosecond light source for time-resolved coincidence spectroscopy", Nanophotonics 10, Sep. 2020, pp. 117-128.

Sebastian Koke et al., Fast $f$-to-$2f$ interferometer for a direct measurement of the carrier-envelope phase drift of ultrashort amplified laser pulses, Opt. Lett. 33, Nov. 2008, pp. 2545-2547.

S. Koke et al., "Noise performance of a feed-forward scheme for carrier-envelope phase stabilization", Appl. Phys. B 104, Jul. 2011, pp. 799-804.

Miguel Miranda et al., "All-optical measurement of the complete waveform of octave-spanning ultrashort light pulses", Opt. Lett. 44, Jan. 2019, pp. 191-194.

* cited by examiner

METHOD AND SYSTEM FOR MEASURING THE CARRIER- ENVELOPE PHASE OFFSET OF ULTRASHORT LASER PULSES

CROSS-REFERENCE

This application claims the benefit of priority under 35 U.S.C. § 119 (e) from Portugal Patent Application No. 118603, filed on Apr. 13, 2023, which is hereby incorporated by reference as if set forth in its entirety herein.

TECHNICAL FIELD

The present disclosure relates to method and system for measuring the carrier-envelope phase offset of ultrashort laser pulses.

BACKGROUND

The carrier-envelope phase (CEP) of a light pulse can be an essential parameter in experiments where few-cycle laser pulses interact with matter to produce effects such as high-order harmonic generation (HHG), strong field ionization and lightwave-induced photocurrents in condensed matter [1-3], as well as for techniques such as field-resolved spectroscopy for molecular fingerprinting in the optical domain [4]. The precision and signal-to-noise ratio (SNR) of several key parameters in these experiments can greatly benefit from the use of pulses with a highly stable CEP or a tagged CEP with post data processing. The latter requires CEP measurements as fast as the laser repetition rate to access and record the CEP of every laser pulse emitted by the laser system (CEP tagging).

With the development of high repetition rate laser systems [5, 6], traditional CEP measurement methods based on f-2f interferometry become very challenging to implement [7]. New single-shot CEP detection schemes based on strong field laser-matter interaction phenomena have enabled CEP measurements up to 400 kHz [8, 9].

However, such highly nonlinear phenomena usually require laser pulses with at least a few tens of microjoules of energy and the measurements suffer from high noise levels due to the associated low photocurrents and/or electron count rates. For lasers with lower pulse energy, all-optical CEP measurement methods are more favourable due to their simplicity and potentially higher signal-to-noise ratios.

Single-shot CEP measurements using f-2f schemes are usually based on measuring spectral interference fringes that encode CEP information in their phase [7]. Often, these spectral fringes are detected by a grating spectrometer and analysed by numerical Fourier transform. Subsequently, the phase of the fringes is determined by taking the complex argument of the spectral amplitude at the peak corresponding to the spectral oscillations of the fringes. This method is often used for low-repetition-rate (sub-100 Hz) systems or slow-loop feedback systems, where the measurements are often averaged over several pulses and are non-consecutive, due to the limited readout speed of the spectrometer.

Using high-speed imaging camera technologies, this CEP measurement scheme has been demonstrated at laser repetition rates from a few kHz up to a few hundred kHz [10-12]. However, it is still technologically challenging to realize real-time CEP output at higher repetition rates due to the required large data throughput for data acquisition and the numerical Fourier transform. Alternatively, the CEP offset can be tracked by measuring single fringes or the contrast of the interference pattern [13, 14]. These methods greatly reduce the detection complexity. However, they also suffer from low signal-to-noise ratios and for certain CEP values their phase sensitivity drops. Therefore, for laser systems with very high repetition rate and low pulse energy, such as laser oscillators, single-shot CEP measurement and tagging remain uncharted. A CEP measurement is normally a relative measurement, i.e., an offset measured with respect to an arbitrary reference CEP value.

These facts are disclosed in order to illustrate the technical problem addressed by the present disclosure.

GENERAL DESCRIPTION AND SUMMARY OF THE DISCLOSURE

The disclosure includes a method for measuring the carrier-envelope phase (CEP) offset of ultrashort light pulses, the method according to an aspect of the disclosure comprising: (i) generating an optical interference signal encoding the CEP offset of the light pulses to be measured; (ii) applying at least two spectral filters in parallel, i.e., non-sequentially, to the generated interference signal, wherein the spectral transmission functions of the spectral filters are periodic and the at least two spectral filters have partial or fully orthogonal components between themselves; (iii) detecting each signal filtered by each of the at least two spectral filters to obtain a magnitude for each of the filtered signals, e.g., as distance coordinates; (iv) converting the two obtained magnitudes for each of the filtered signals to a polar representation having a radius and an angle; (v) outputting the CEP offset from the angle of the converted polar representation. Surprisingly, the present solution is in excellent agreement with a simultaneous standard measurement performed with a fast line-scan camera.

The present disclosure relates to a method and system for measuring offsets in the carrier-envelope phase (CEP) of ultrashort laser pulses based on nonlinear interferometry that unexpectedly allows consecutive, single-shot CEP detection at high-repetition rates of up to more than 200 kHz.

In an embodiment for better results of measuring the carrier-envelope phase offset, the detection of each signal filtered by each of the at least two spectral filters to obtain a magnitude comprises calibration and/or correction operations.

In an embodiment for better results of measuring the carrier-envelope phase offset, the calibration and/or correction operations comprise using more than two filters.

In an embodiment, the optical interference signal encoding the CEP offset of the light pulses is generated with a nonlinear interferometer.

In an embodiment, the optical interference signal encoding the CEP offset of the light pulses is generated with a f-2f interferometer.

In an embodiment for better results of measuring the carrier-envelope phase offset, the transmission functions of the spectral filters are periodic sine and cosine functions.

Another aspect of the present disclosure relates to a method that comprises tuning the periodicity of the transmission functions of the spectral filters for measuring the carrier-envelope phase offset, in particular the transmission of the spectral filters having tuneable periodicity.

In an embodiment, the at least two spectral filters comprise an interferometer, an étalon, an interference filter; and optionally birefringent wedges, a prism, a waveplate, a polarizer, a lens, a diffraction grating, a spatial mask in the Fourier plane of a 4f pulse shaper; or combinations thereof.

In another embodiment for better results of measuring the carrier-envelope phase offset, the at least two spectral filters comprise a single modified Michelson interferometer comprising a half-wave plate in a first arm and a quarter-wave plate in a second arm, implementing the two spectral filters with partially orthogonal spectral transmission functions.

In an embodiment for better results of measuring the carrier-envelope phase offset, the two spectral filters are tuneable by changing the time delay between the two arms of the Michelson interferometer.

In an embodiment for better results of measuring the carrier-envelope phase offset, one interferometer arm is adjustable and the period of the transmission functions is tuneable by changing the optical path length introduced by the arm.

In an embodiment for better results of measuring the carrier-envelope phase offset, the optical path length introduced by the interferometer arm is changed by changing the refractive index in the arm and/or by adjusting the length of the arm.

In an embodiment for better results of measuring the carrier-envelope phase offset, the refractive index in one interferometer arm is changed by introducing an optical element such as an optical window and/or optical wedges inside the arm, or by changing the gas pressure inside an optical gas cell.

In an embodiment, the output of each of the two spectral filters is detected by sending it through a polarizing beam splitter, in particular a 45° polarizing beam splitter, and detecting transmitted and reflected light.

In an embodiment for better results of measuring the carrier-envelope phase offset, the output signal of each of the at least two spectral filters is detected by sending it through a polarizing beam splitter, in particular a polarizing beam splitter oriented at 45° with respect to the incoming polarization, and detecting the transmitted and reflected signals from the beam splitter, and using the two detected signals to perform the correction step to obtain the magnitude for each of the filtered signals.

In an embodiment for better results of measuring the carrier-envelope phase offset, each output signal of each of the at least two spectral filters is detected by a balanced detector.

In an embodiment, converting the magnitudes to polar representation and outputting the angle of the converted polar representation is carried out by an arctangent function (atan), or a 2-argument arctangent function (atan 2).

It is also disclosed a system for measuring the carrier-envelope phase (CEP) offset of ultrashort light pulses, the system comprising: an optical interference signal generator for encoding the CEP offset of a light pulse to be measured; at least two spectral filters in parallel for filtering the generated interference signal, wherein the spectral transmission functions of the spectral filters are periodic and at least two spectral filters have partial or fully orthogonal components between themselves; a photodetector for detecting each signal filtered by each of the at least two spectral filters to obtain a magnitude for each of the filtered signals; a converter arranged to convert the two obtained magnitudes to a polar representation having a radius and an angle; an output deriving the CEP offset from the angle of the converted polar representation.

In an embodiment, the optical interference signal generator is a nonlinear interferometer.

In an embodiment, the nonlinear interferometer is a f-2f interferometer.

In an embodiment for better results of measuring the carrier-envelope phase offset, the at least two spectral filters comprise an interferometer, an étalon, or an interference filter; birefringent wedges, a prism, a waveplate, a polarizer, a lens, a diffraction grating, a spatial mask in the Fourier plane of a 4f pulse shaper; or combinations thereof.

In an embodiment, the at least two spectral filters comprise two interferometers; preferably, wherein partially or fully orthogonal components between the spectral filters are introduced by an additional phase delay between the two interferometers.

In an embodiment for better results of measuring the carrier-envelope phase offset, the at least two spectral filters are comprised by a single modified Michelson interferometer comprising a half-wave plate, a quarter-wave plate, and a polarisation beam splitter.

In an embodiment for better results of measuring the carrier-envelope phase offset, the modified Michelson interferometer is configured to perform the following steps: splitting the signal from the optical interference signal generator into two replicas by the polarisation beam splitter; altering one replica to linear polarisation at 45 degrees by a half wave-plate and altering the other replica to circular polarisation by a quarter-wave plate; and interfering the two replicas from the previous step by reflecting from and transmitting through a polarisation beam splitter; wherein the reflected and transmitted channels from the previous step comprise the spectral filters with partially orthogonal functions.

In an embodiment, each photodetector comprises a polarisation beam splitter and two photodiodes.

In an embodiment, the system further comprises an electronic processing system which comprises an analog circuit or a digital processor, arranged to receive the signal from the photodetectors as input and arranged to output the CEP offset from the ultrashort light pulse. The analog circuit or digital processor comprise hardware elements in support of operation of the system. For instance, when the system includes a hardware processor, it can further comprise memory elements that store code which is executed by the processor to implement one or more functions described herein.

It is also disclosed a field-resolved spectrometer comprising said system.

It is further disclosed the use of said system in spectroscopy or in field-resolved spectroscopy.

In an embodiment, a nonlinear interferometer comprising what we call an analogue detector implementing said system (see FIG. 2) was designed and built, and CEP offset measurements were performed on a 200 kHz few-cycle optical parametric chirped pulse amplification (OPCPA) laser system. The results are in excellent agreement with a simultaneous measurement performed with a fast line-scan camera.

BRIEF DESCRIPTION OF THE DRAWINGS

The following figures provide preferred embodiments for illustrating the disclosure and should not be seen as limiting the scope of invention.

DETAILED DESCRIPTION

The present disclosure relates to a method and system for measuring offsets in the carrier-envelope phase (CEP) of ultrashort laser pulses based on nonlinear interferometry that unexpectedly allows consecutive, single-shot CEP detection at high-repetition rates of up to more than 200 kHz.

It is disclosed a method which allows detecting and analysing the spectral fringes in a fully optical manner. It is demonstrated that this method can be realized with an optical setup built using commercially available optical components. This setup is used for measuring the CEP offset of a 200 kHz optical parametric chirped-pulse amplification (OPCPA) laser system [5, 12] and this device is benchmarked with a conventional technique, e.g., one employing a diffraction grating and a fast line-scan camera. Here, the disclosure can be seen as if the CEP detection performs the Fourier transform optically instead of numerically.

Figure 1:
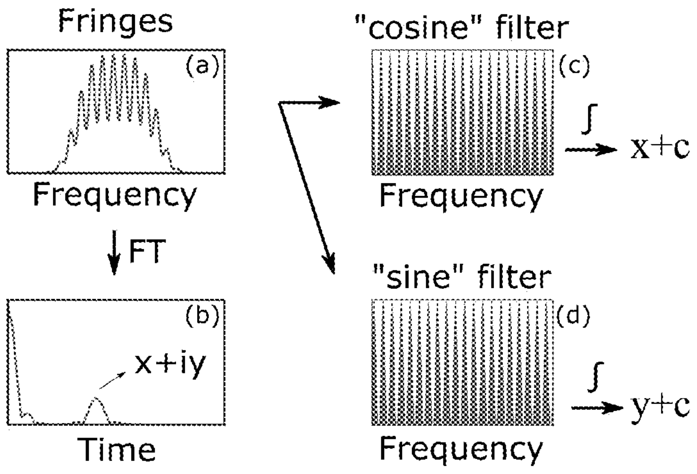
FIG. 1: Graphic representation of the partial optical Fourier transform.

FIG. 1 shows a graphical representation of the optical Fourier transform, where: (a) represents fringes from an f-2f interferometer, (b) represents the absolute value of the Fourier transform of the signal, (c) represents a sine- and (d) a cosine-like periodic filter.

Traditionally, the spectral fringes acquired by a spectrometer, as illustrated in FIG. 1(*a*), are analysed by inverse Fourier transforming the spectral signal, i.e.

$$x+iy=\int_{-\infty}^{+\infty} I(\omega)e^{-i\omega\tau}d\omega \tag{1}$$

where x, y are the real and imaginary amplitudes of the Fourier transform, respectively, I(ω) is the spectral intensity of the signal, τ is a time delay and the integral is taken from −∞ to +∞.

In the inverse Fourier domain (time domain), the fringe oscillations can be identified as a peak at a given time $\tau_0$, as shown in FIG. 1(*b*). This peak corresponds to the time delay between the fundamental and the second harmonic pulses in the f:2f interferometer. The phase of the fringes, φ, is subsequently determined by the argument of the complex amplitude at this peak, i.e., φ=arctan 2 (x,y). Often, $\tau_0$ is constant and a characteristic parameter of the f-2f interferometer, with the pulse energy and pulse duration also remaining relatively constant. Therefore, the fringe analysis can be simplified from a complete Fourier transform to integrals calculated only for a given $\tau_0$. Since $e^{-iw\tau_0}=\cos(\omega\tau_0)-i\sin(\omega\tau_0)$ and I(ω) is real, the complex amplitude of Eq. (1) can be rewritten as $$x=\int_{-\infty}^{+\infty} I(\omega)\cos(\omega\tau_0)d\omega \tag{2}$$

$$y=-\int_{-\infty}^{+\infty} I(\omega)\sin(\omega\tau_0)d\omega$$

Besides numerical integration, x and y can also be extracted in a different way by having the signal, I(ω), pass through two periodic filters with cos $(\omega\tau_0)$ and sin $(\omega\tau_0)$ transmittances, respectively.

However, even in an ideal case, an optical filter can only have a transmittance, t, between 0 and 1, e.g., $t_{cos}=0.5\,[1+\cos(\omega\tau_0)]$, which leads to an additional constant, c, corresponding to the pulse energy, as shown in FIGS. 1(*c*) and (*d*). By calibrating and removing c in a correction step, the magnitudes x and y, and hence the phase φ, can be determined. In practice, this concept can be realized by using any periodic spectral filters that have mathematically orthogonal components between themselves. The steps of calibrating or removing c may in practice involve additional filters.

To demonstrate this, a modified Michelson interferometer, comprising a polarization beam splitter and wave plates, was used to realize two periodic spectral filters, as presented below. Nevertheless, periodic spectral filters can be implemented differently, such as by using periodic spatial masks in the Fourier-plane of a 4f pulse shaper, an étalon or Fabry-Pérot interferometer with matched thickness, a high-order waveplate with polarizer, interference filters, birefringent wedges, etc.

Figure 2:
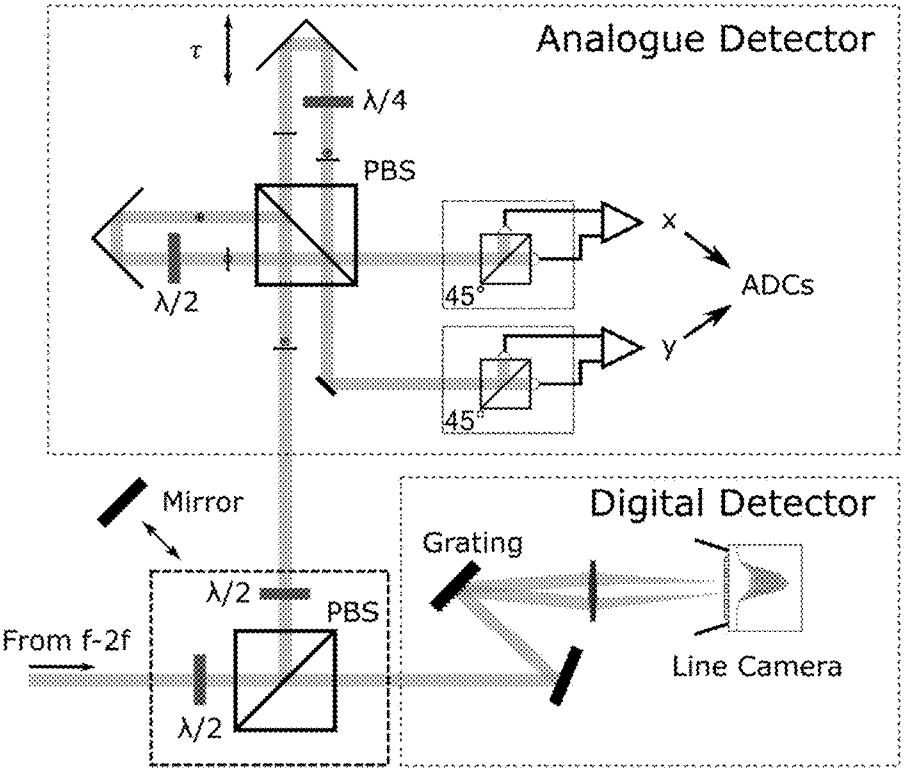
FIG. 2: Schematic representation of an embodiment of the system for measuring the CEP offset of ultrashort laser pulses.

FIG. 2 shows a schematic representation of an embodiment of the system for measuring the CEP offset of ultrashort laser pulses, wherein the ADCs are analogue-to-digital converters.

As an exemplary embodiment of the phase measurement, a CEP detection scheme employing an analogue detector based on a modified Michelson interferometer was built, as shown in FIG. 2, which was designed to implement both the sine- and cosine-like filters in a single device. The signal (at 45° polarization), with spectral amplitude $A_0(\omega)=\sqrt{I(\omega)}$, is split by the polarizing beam splitter (PBS) of the modified Michelson interferometer. The reflection, or the s-polarization part, is reflected by a retroreflector and passes through a λ/2 plate which rotates the polarization by 45°. This leads to the same spectral amplitude in the horizontal and the vertical polarization directions, i.e., $$A_p^{(c)}(\omega)=A_s^{(c)}(\omega)=\frac{A_0(\omega)}{2} \tag{3}$$

where the subscripts p and s denote p- and s-polarisations, respectively, and the superscript (c) implies a constant delay in this arm. Meanwhile, the p-polarisation part is transmitted by the beam splitter and reflected by another retroreflector that can be moved by a translation stage to change the time delay τ between the interferometer arms. Changing t allows tuning the periodicity of the spectral filters. In contrast to the other arm, a λ/4 plate is used to alter the polarisation state from linear to circular polarisation, leading to an additional π/2 phase delay between p- and s-polarizations. For practical reasons, this phase may slightly deviate from π/2, becoming $$\frac{\pi}{2}+\Delta\phi.$$

Therefore, the complex spectral amplitudes of the two polarisation components are $$A_p(\tau)(\omega)=\left[\frac{A_0(\omega)}{2}\right]\exp(i\tau\omega) \tag{4}$$

$$A_s(\tau)(\omega)=\left[\frac{A_0(\omega)}{2}\right]\exp\left(i\tau\omega+\frac{i\pi}{2}+i\Delta\phi\right)$$

The beams from the two arms are subsequently mixed and split into x and y channels via the same PBS cube. In each channel, a polarizer is placed at 45° and two photodiodes (PD) are used to detect the transmitted and reflected light, respectively. Subsequently, the signals from each photodiode are amplified by individual transimpedance amplifiers (TIAs) and compared by two differential amplifiers, which can also be implemented digitally by measuring the PD signals directly. The above procedure comprises the corrective step to remove the pulse energy c from the measurement.

The electrical signals of the x and y channels are obtained as:

$$x = \int \eta(\omega)\left[\frac{A_0(\omega)}{2}\right]\cos(\tau\omega)d\omega \qquad (5)$$

$$y = \int \eta(\omega)\left[\frac{A_0(\omega)}{2}\right]\sin(\tau\omega + \Delta\phi)d\omega,$$

where $\eta(\omega)$ is the spectral response of the PDs. For simple fringes with phase $\phi$, e.g., $$A_0^2(\omega) \propto 1 + \cos(\tau_0\omega + \varphi),$$

the integrals in Eq. (5) reduce to $$x = a\cos(\varphi) \qquad (6)$$

$$y = b\sin(\varphi - \Delta\varphi),$$

where a, b are the conversion coefficients for each channel. With known a, b and $\Delta\varphi$, these equations can be solved as $$x' = x/a \qquad (7)$$

$$y' = y/(b\cos\Delta\varphi) + x'\tan(\Delta\varphi).$$

The phase is given by $\varphi$=arctan 2 (x',y') and the signal intensity is $I=\sqrt{(x'^2+y'^2)}$.

To demonstrate this setup and to benchmark its functionality, the OPCPA laser system at the Lund Laser Centre (LLC) was used as the light source and a grating spectrometer with a fast line-scan camera, also referred to as the digital detector, was built to measure the spectral fringes simultaneously with the disclosed analogue detector. The OPCPA laser system provides 10 μJ, 6.2 fs, actively CEP-stabilized pulses at a 200 kHz repetition rate [12]. To measure the CEP of the amplified pulses, a small portion of the OPCPA beam with 0.5 μJ energy per pulse is split and sent to a conventional f-2f interferometer.

In the f-2f interferometer, the pulses are focused into a sapphire plate to obtain an octave-spanning spectrum via white-light generation and subsequently refocused into a beta barium borate (BBO) crystal for generating the second harmonic. The second harmonic and the spectrally overlapping fundamental around 532 nm are filtered out with a 10 nm bandwidth bandpass filter. Due to type-I phase matching in the BBO crystal, the polarization of the second harmonic is perpendicular to the fundamental. Therefore, a half-wave plate and a polarizer are used to rotate the polarization states by 45° and interfere the second harmonic and the fundamental, which creates the spectral fringes encoding the CEP.

As shown in FIG. 2, this signal is split with a polarising beam splitter between the analog and digital detectors. The digital detector uses a grating with 1200 lines/mm to spectrally disperse the fringe signal, followed by a lens with 150 mm focal length. At the focal plane, where the spectral fringes are resolved spatially, a fast line-scan CCD camera (SPL2048-50K, Basler A G) was used to record the spectral fringes at the repetition rate of the laser (200 kHz).

Figure 3:
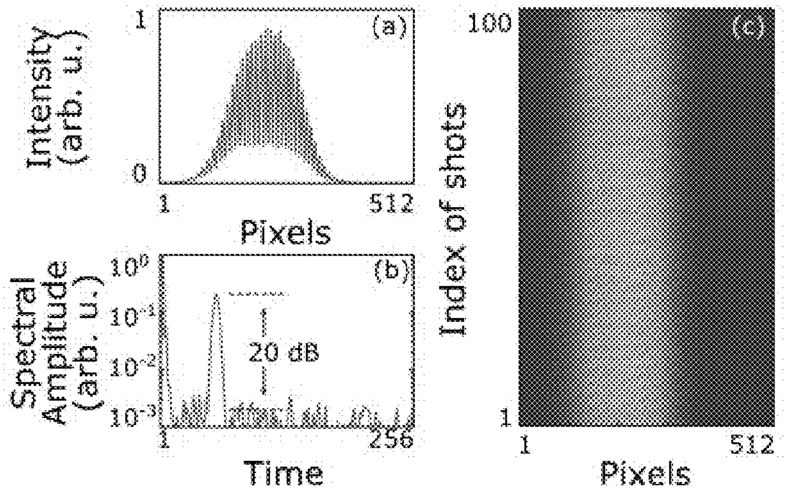
FIG. 3: Graphic representation of the measurement results from the digital CEP detector.

FIG. 3 shows a graphical representation of the measurement results from the digital CEP detector wherein (a) represents a single-shot measurement of the spectral fringes from the f-2f interferometer; (b) represents the amplitude of the Fourier transform of the fringe signal in logarithmic scale; (c) represents a spectrogram of the spectral fringes for 100 consecutive laser shots, while the active CEP stabilization of the laser was switched off.

FIG. 3(*a*) presents a single-shot spectrum of the spectral fringes from the f-2f interferometer. The Fourier transform of the spectrum is shown in FIG. 3(*b*), where a peak can be identified apart from the DC component. As indicated in the figure, this peak is approximately 20 dB above the noise floor, implying a 10 mrad (arcsin (1/100)) uncertainty in the phase retrieved from the complex amplitude at the peak. FIG. 3(*c*) is a spectrogram obtained by measuring the spectral fringes for 100 consecutive laser shots, when the active CEP stabilization of the laser was switched off.

For the analogue detector, a two-channel analogue-to-digital converter is used to simultaneously measure and acquire the voltage amplitudes corresponding to x' and y'.

To ensure simultaneity of the two measurements, the data acquisition for the analogue detector lasts longer (0.5 s in this particular case) and is triggered slightly earlier than for the digital detector.

Figure 4:
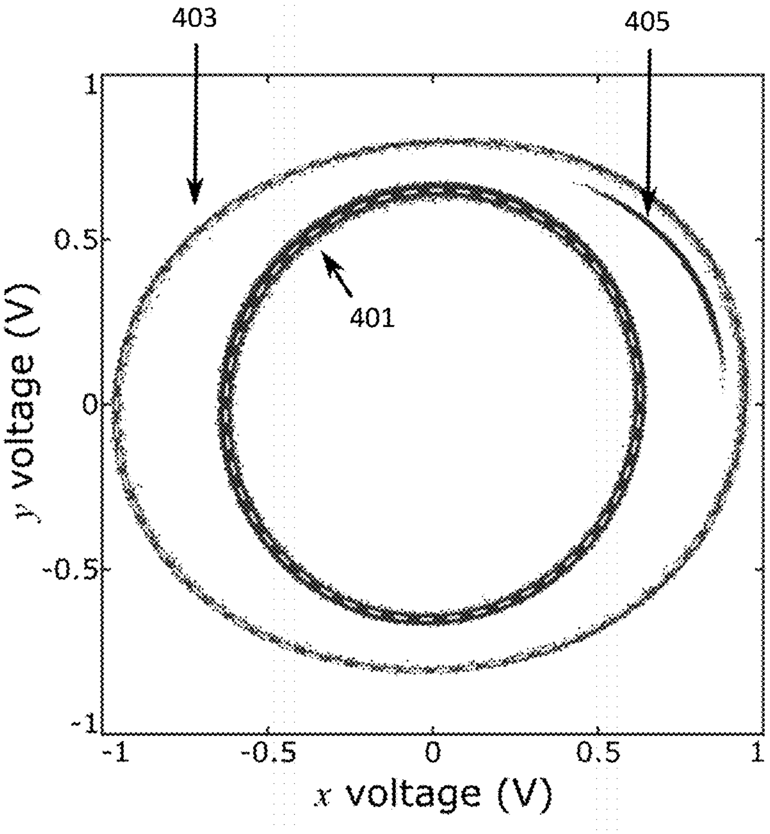
FIG. 4: Graphic representation of CEP measurement results from the analogue detector compared with the digital detector, according to x and y channel voltage readouts.

FIG. 4 shows a graphical representation of the CEP measurement results from the analogue detector compared to the digital detector, where 401 represents a correlated measurement between the analogue and the digital detector. 403 represents the case where the analogue detector is used as stand-alone device with unstabilized CEP, and 405 represents the case where the analogue detector is used as a stand-alone device with stabilized CEP; the dashed lines are fitted ellipses.

FIG. 4 shows the recorded voltage amplitudes corresponding to x' and y' for the x- and y-channels from 100,000 consecutive laser shots, for a 0.5 s measurement time. The data points for 401 are located around a nearly perfect circle. The dashed line on top of the raw data is a fitted ellipse based on equation 6, from which the parameters a, b and $\Delta\phi$ are determined, comprising the calibration step. In this measurement condition, it was found that s/b=1.039 and $\Delta\phi$=31.51 mrad.

To determine the best overlap between the analogue and digital detectors, the retrieved phases, $\phi_A$ and $\phi_D$, are correlated with a moving slice of $\phi_A$ as $$\rho \pm (j) = (1/N)\left|\sum\nolimits_{k=1\ to\ N} e^{i\phi_A(k+j)\pm i\phi_D(k)}\right| \qquad (8)$$

where N is the number of data points from the digital detector.

Figure 5:
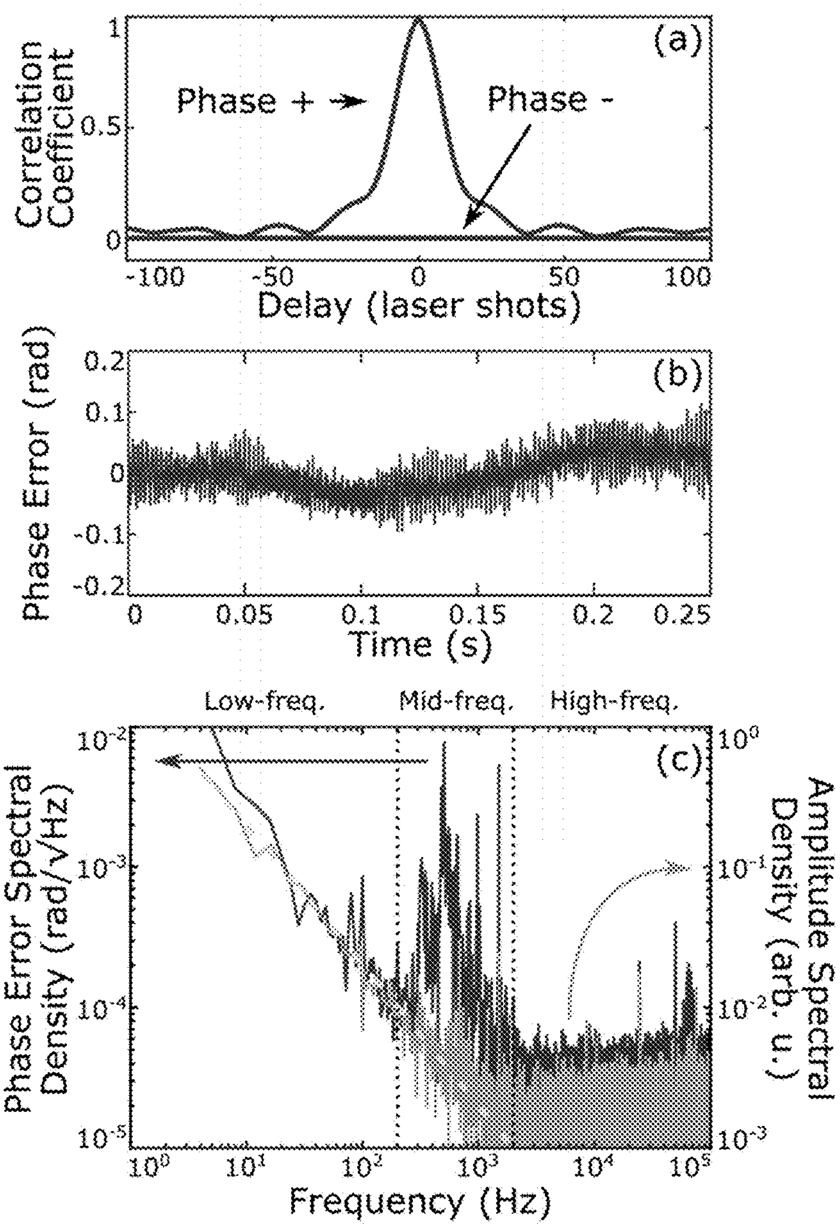
FIG. 5: Graphic representation of CEP measurement results from the analogue detector compared with the digital detector, according to phase and correlation coefficient.

The correlation is calculated for both plus and minus cases due to sign ambiguity in the phase obtained from the f-2f method and the correlation coefficients are plotted against delay in FIG. 5(*a*). The zero delay is found where the correlation coefficient is maximized for subtracted phases, with the coefficients for added phases remaining near zero. At the maximum, the correlation coefficient reaches 0.9995 implying an excellent agreement between the two measurement methods. The above procedure ensures synchronisation of the detectors.

FIG. 5 shows a graphical representation of CEP measurement results from the analogue detector compared to the digital detector, according to phase and correlation coefficient, wherein (a) represents the correlation between the measurements, (b) represents the phase differences at maximum overlap and (c) represents the Fourier transform of the phase error (dark grey), Fourier transform of the laser intensity (light grey) and fitted 1/f line (dashed).

FIG. 5(*b*) presents the phase difference between the synchronized digital and analogue detectors. This error signal, with a standard deviation $\sigma$=33.13 mrad, contains the total error from both the digital and analogue detectors. By Fourier analysis, the phase error spectrum, shown in the dark grey curve in FIG. 5(*c*), can be distinguished by three spectral intervals: low-, medium- and high-frequency, separated by 200 Hz and 2 kHz, respectively. By numerical spectral filtering, these three spectral parts contribute to the total phase error as $\sigma 1$=24.26 mrad, $\sigma_M$=21.39 mrad and $\sigma_H$=7.145 mrad, respectively. The low-frequency component, from DC to 200 Hz, is dominated by 1/f flicker noise, as indicated by the dashed line. This spectral component shows a similar spectrum to the intensity ($\sqrt{x'^2+y'^2}$) as presented by the light grey curve.

This observation indicates that the phase retrieval is contaminated by laser intensity fluctuations due to imperfections in the polarising beam splitters, unbalanced gain of the TIAs and limited common-mode rejection ratio (CMRR) of the differential amplifiers. This noise contribution can be improved by using high quality optics and electronics.

The medium-frequency range, from 200 Hz to 2 kHz, mainly contains discrete spectral peaks, which can be associated to coupling of the mechanical and acoustic noise from turbomolecular vacuum pumps near the setup. The high-frequency part (>2 kHz) exhibits a white noise floor. In this measurement, this noise floor is mainly limited by the digital detector as estimated from the 10 mrad uncertainty. In contrast, the estimated equivalent phase noise floor of the analogue detector is about 1.6 mrad, corresponding to $5\times10^{-6}$ rad/$\sqrt{\text{Hz}}$ of spectral amplitude density, which is mainly contributed for by the Johnson noise in the TIA. The estimated shot noise only contributes an uncertainty of 0.2 mrad or $8\times10^{-7}$ rad/$\sqrt{\text{Hz}}$. However, for laser systems with higher repetition rate and lower pulse energy, this noise floor may also be limited by shot noise [13].

When used as a stand-alone device, the analogue CEP detector can be utilized in a different mode. As indicated in FIG. 2, the signal from the f-2f interferometer can be directly fed into the detector with a mirror instead of the wave plates and polarizing beam splitter. Since the polarization of the second harmonic is perpendicular to that of the fundamental, the second harmonic and the fundamental are split into the two arms of the interferometer, respectively. Therefore, after recombination, the direct interference between the second harmonic and the fundamental is detected by the photodiodes, leading to a higher contrast of the interference pattern and a higher number of detected photons. Due to the saturation of the photodiodes, an iris is placed before the device to limit the intensity of the total optical signal.

The outer scatter plot in FIG. 4 presents the CEP measurement in this mode with unstabilized and stabilized CEP, respectively, as well as an ellipse fit based on equation 6. Noticeably, this measurement encloses a larger area compared to the previous measurement, suggesting an overall higher signal. In this case, the ellipse has an aspect ratio of 1.186 with a slight tilt $\Delta\phi$=44.98 mrad, since only the delay was optimized for the maximum area while the half-wave plate and quarter-wave plate remained untouched compared to the previous condition.

When the CEP is actively stabilized, the CEP signal points are concentrated within an arc (denoted as Stand-alone Locked in FIG. 4), corresponding to a phase instability of 146.8 mrad. The phase uncertainty in this measurement can be evaluated by comparing the signal uncertainty, $\delta r$, and mean value, $\langle r \rangle$, in the polar direction as arctan ($\delta r/\langle r \rangle$) [8]. To eliminate a possible intensity-dependent phase shift from the f-2f interferometer, only a phase slice around the mean phase value (±50 mrad) is used for statistics. To avoid the varying radius in the ellipse, the actual evaluation is based on the retrieved intensity uncertainty, $\delta 1$, and mean value, $\langle 1 \rangle$, as arcsin ($\delta 1/\langle 1 \rangle$), which gives a phase uncertainty of 4.251 mrad.

To conclude, a new detection scheme based on optical Fourier transform that allows single-shot measurement and analysis of the CEP fringes from a nonlinear interferometer is disclosed and demonstrated with a simple interferometric device fully built using commercially available optical components and benchmarked with a conventional detection technique at 200 kHz. This device shows high signal-to-noise ratio and a great precision (<33 mrad). This method opens new possibilities to diagnose and control the CEP of ultrashort laser systems by performing single-shot CEP measurements at high-repetition rate.

Figure 6:
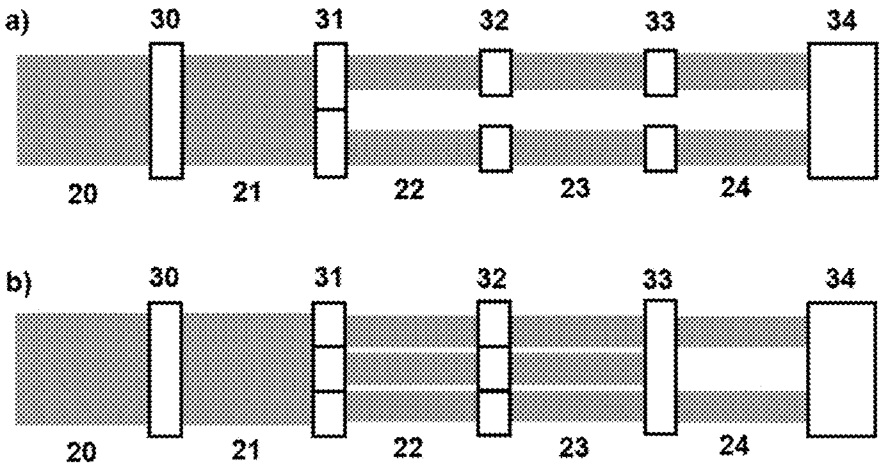
FIG. 6: Graphic representation of two embodiments of the system for measuring the CEP offset of ultrashort light pulses.

FIG. 6*a*) shows a graphic representation of an embodiment of the system for measuring the carrier-envelope phase (CEP) offset of ultrashort light pulses, wherein 20 represents a beam of ultrashort pulses to be measured, 21 represents a light output from an optical interference signal generator, 22 represents a light output from two periodic spectral filters, 23 represents an output from two periodic spectral filters after being detected, 24 represents an output from two detectors after a corrective step. 30 represents an optical interference signal generator that encodes the CEP of laser pulses in the form of spectral interferences, 31 represents two spectral filters with orthogonal components between them, 32 represents two photodetectors, 33 represents a corrector that is an integral part of each detector, and 34 represents a receptor of the output signal and/or signal processing, e.g. using a computer to obtain the CEP of the laser pulses. FIG. 6*b*) shows a graphic representation of an alternative embodiment of the system for measuring the carrier-envelope phase (CEP) offset of ultrashort light pulses, wherein 20 represents a beam of ultrashort pulses to be measured, 21 represents a light output from an optical interference signal generator, 22 represents a light output from three periodic spectral filters, 23 represents an output from three periodic spectral filters after being detected, 24 represents an output from three detectors after a corrective step. 30 represents an optical interference signal generator that encodes the CEP of laser pulses in the form of spectral interferences, 31 represents three periodic spectral filters with orthogonal components between at least two of them, 32 represents three photodetectors, 33 represents a corrector that uses the signals from three photodetectors as input to perform a corrective step, and 34 represents a receptor of the output signal and/or signal processing, e.g. using a computer to obtain the CEP of the laser pulses.

The term "comprising" whenever used in this document is intended to indicate the presence of stated features, integers, steps, components, but not to preclude the presence or addition of one or more other features, integers, steps, components, or groups thereof.

Diagrams of particular embodiments of the presently disclosed methods are depicted in figures. The diagrams illustrate the functional information one of ordinary skill in the art requires to perform said methods or systems required in accordance with the present disclosure.

It will be appreciated by those of ordinary skill in the art that unless otherwise indicated herein, the particular sequence of steps described is illustrative only and can be varied without departing from the disclosure. Thus, unless otherwise stated, the steps described are so unordered meaning that, when possible, according to the disclosure, the steps can be performed in any convenient or desirable order.

The disclosure should not be seen in any way restricted to the embodiments described and a person with ordinary skill in the art will foresee many possibilities to modifications thereof. The above-described embodiments are combinable.

The following claims further set out particular embodiments of the disclosure.

REFERENCES

[1] C. Ott, M. Schönwald, P. Raith, A. Kaldun, G. Sansone, M. Krüger, P. Hommelhoff, Y. Patil, Y. Zhang, K. Meyer et al., New J. Phys. 15, 073031 (2013).

[2] T. Wittmann, B. Horvath, W. Helml, M. G. Schätzel, X. Gu, A. L. Cavalieri, G. G. Paulus, and R. Kienberger, Nat. Phys. 5, 357 (2009).

[3] A. Schiffrin, T. Paasch-Colberg, N. Karpowicz, V. Apalkov, D. Gerster, S. Mühlbrandt, M. Korbman, J. Reichert, M. Schultze, S. Holzner, J. V. Barth, R. Kienberger, R. Ernstorfer, V. S. Yakovlev, M. I. Stockman, and F. Krausz, Nature 493, 70 (2012).

[4] I. Pupeza, M. Huber, M. Trubetskov, W. Schweinberger, S. A. Hussain, C. Hofer, K. Fritsch, M. Poetzlberger, L. Vamos, E. Fill, T. Amotchkina, K. V. Kepesidis, A. Apolonski, N. Karpowicz, V. Pervak, O. Pronin, F. Fleischmann, A. Azzeer, M. Žigman & F. Krausz, Nature 577, 52-59 (2020).

[5] A. Harth, C. Guo, Y.-C. Cheng, A. Losquin, M. Miranda, S. Mikaelsson, C. M. Heyl, O. Prochnow, J. Ahrens, U. Morgner, A. L'Huillier, and C. L. Arnold, J. Opt. 20, 014007 (2017).

[6] F. J. Furch, T. Witting, A. Giree, C. Luan, F. Schell, G. Arisholm, C. P. Schulz, and M. J. J. Vrakking, Opt. Lett. 42, 2495 (2017).

[7] M. Kakehata, H. Takada, Y. Kobayashi, K. Torizuka, Y. Fujihira, T. Homma, and H. Takahashi, Opt. Lett. 26, 1436 (2001).

[8] D. Hoff, F. J. Furch, T. Witting, K. Rühle, D. Adolph, A. M. Sayler, M. J. J. Vrakking, G. G. Paulus, and C. P. Schulz, Opt. Lett. 43, 3850 (2018).

[9] M. Kubullek, Z. Wang, K. von der Brelje, D. Zimin, P. Rosenberger, J. Schötz, M. Neuhaus, S. Sederberg, A. Staudte, N. Karpowicz, M. F. Kling, and B. Bergues, Optica 7, 35 (2020).

[10] T. Fordell, M. Miranda, C. L. Arnold, and A. L'Huillier, Opt. Express 19, 23652 (2011).

[11] F. Lücking, V. Crozatier, N. Forget, A. Assion, and F. Krausz, Opt. Lett. 39, 3884 (2014).

[12] S. Mikaelsson, J. Vogelsang, C. Guo, I. Sytcevich, A.-L. Viotti, F. Langer, Y.-C. Cheng, S. Nandi, W. Jin, A. Olofsson, R. Weissenbilder, J. Mauritsson, A. L'Huillier, M. Gisselbrecht, and C. L. Arnold, Nanophotonics 10, 117 (2020).

[13] S. Koke, C. Grebing, B. Manschwetus, and G. Steinmeyer, Opt. Lett. 33, 2545 (2008).

[14] S. Koke, A. Anderson, H. Frei, A. Assion, and G. Steinmeyer, Appl. Phys. B 104, 799 (2011).

[15] M. Miranda, F. Silva, L. Neoricic, C. Guo, V. Pervak, M. Canhota, A. S. Silva, Í. J. Sola, R. Romero, P. T. Guerreiro, A. L'Huillier, C. L. Arnold, and H. Crespo, Opt. Lett. 44, 191 (2019).

The invention claimed is:

1. A method for measuring the carrier-envelope phase (CEP) offset of ultrashort light pulses, the method comprising:

generating, with a non-linear interferometer, an optical interference signal encoding the CEP offset of a light pulse to be measured;

applying at least two spectral filters in parallel to the generated optical interference signal, wherein the spectral transmission functions of the spectral filters are periodic and the at least two spectral filters have partial or fully orthogonal components between themselves;

detecting each signal filtered by each of the at least two spectral filters to obtain a magnitude for each of the filtered signals;

converting the two obtained magnitudes for each of the filtered signals to a polar representation having a radius and an angle; and outputting the CEP offset from the angle of the converted polar representation for performing consecutive single-shot CEP measurements.

2. The method according to claim 1, wherein the optical interference signal encoding the CEP offset of the light pulses is generated with a nonlinear interferometer.

3. The method according to claim 1, wherein:

the detection of each signal filtered by each of the at least two spectral filters to obtain a magnitude comprises calibration and/or correction operations;

the calibration and/or correction operations comprise using more than two filters;

the transmission functions of the spectral filters are periodic sine- and cosine functions, the transmission of the spectral filters have tuneable periodicity, or a combination of one or more of the foregoing.

4. The method according to claim 1, wherein the at least two spectral filters are selected from the group consisting of: an interferometer, an étalon, an interference filter, birefringent wedges, a prism, a waveplate, a polarizer, a lens, a diffraction grating, a spatial mask in the Fourier plane of a 4f pulse shaper, and combinations thereof.

5. The method according to claim 4, providing a single modified Michelson interferometer that is distinct from the non-linear interferometer, wherein the single modified Michelson interferometer receives the optical interference signal from the non-linear interferometer, and wherein the single modified Michelson interferometer comprises a polarization beam splitter, a half-wave plate in a first interferometer arm and a quarter-wave plate in a second arm, configured to implement the at least two spectral filters with periodic and partially orthogonal spectral transmission functions.

6. The method according to claim 5, wherein the output signal of each of the at least two spectral filters is detected by sending the output signal through a polarizing beam splitter and detecting a transmitted and reflected signal or signals from the beam splitter, and using the two detected signals to perform a correction step to obtain the magnitude for each of the filtered signals and/or wherein each output signal each of the at least two spectral filters is detected by a balanced detector.

7. The method according to claim 1, wherein converting to polar representation and outputting the angle of the converted polar representation is carried out by an arctangent function (atan), or a 2-argument arctangent function (atan2).

8. A system for measuring the carrier-envelope phase (CEP) offset of ultrashort light pulses, the system comprising:

an optical interference signal generator for generating an optical interference signal encoding the CEP offset of a light pulse to be measured;

at least two spectral filters in parallel for filtering the generated optical interference signal, wherein the spectral transmission functions of the spectral filters are periodic and the at least two spectral filters have partially or fully orthogonal components between themselves;

a photodetector for detecting each signal filtered by each of the at least two spectral filters to obtain a magnitude for each of the filtered signals;

a converter for converting the obtained magnitudes for each of the filtered signals to a polar representation having a radius and an angle; and an output for providing the CEP offset from the angle of the converted polar representation for performing consecutive single-shot CEP measurements.

9. The system according to claim 8, wherein the optical interference signal generator is a nonlinear interferometer.

10. The system according to claim 8, wherein the detectors detecting each signal filtered by each of the at least two spectral filters to obtain a magnitude are further configured to perform calibration and/or correction operations.

11. The system according to claim 8, wherein the transmission functions of the spectral filters: are periodic sine- and cosine functions, have tuneable periodicity, or are periodic functions having tuneable periodicity.

12. The system according to claim 8, wherein the at least two spectral filters are selected from the group consisting of: an interferometer, an étalon, an interference filter, birefringent wedges, a prism, a waveplate, a polarizer, a lens, a diffraction grating, a spatial mask in the Fourier plane of a 4f pulse shaper, and combinations thereof.

13. The system according to claim 11, wherein the at least two spectral filters comprise interferometers and wherein partially or fully orthogonal components between the spectral filters are introduced by introducing delays between the interferometers.

14. The system according to claim 8, further comprising a single modified Michelson interferometer that is distinct from the optical interference signal generator, wherein the single modified Michelson interferometer receives the optical interference signal from the optical interference signal generator, and wherein the single modified Michelson interferometer comprises a half-wave plate, a quarter-wave plate, and a polarisation beam splitter configured to implement the at least two spectral filters.

15. The system according to claim 14, wherein the modified Michelson interferometer is configured to:

split the signal from the optical interference signal generator into two replicas by the polarisation beam splitter;

alter one replica to linear polarisation at 45 degrees by a half wave-plate and altering the other replica to circular polarisation by a quarter-wave plate; and interfere the two replicas from the previous step by reflecting from and transmitting through the polarisation beam splitter;

wherein the reflected and transmitted channels from the previous step comprise the spectral filters with partially orthogonal functions.

16. The system according to claim 8, wherein each photodetector comprises a polarisation beam splitter and two photodiodes.

17. The system according to claim 10, wherein the detector detecting each filtered signal is a balanced detector.

18. The system according to claim 8, comprising an electronic processing system which comprises an analog circuit or a digital processor, wherein the analog circuit or the digital processor is arranged to receive the magnitude for each signal from the photodetectors as input and arranged to output the CEP offset from the ultrashort light pulse.

19. A field-resolved spectrometer comprising the system according to claim 8.

20. The method of claim 1, wherein the steps for measuring the carrier-envelope phase offset of ultrashort light pulses are further to a method of spectroscopy or field-resolved spectroscopy.

* * * * *